(12) United States Patent
El-Zehiry et al.

(10) Patent No.: US 8,885,961 B2
(45) Date of Patent: Nov. 11, 2014

(54) SYSTEM AND METHOD FOR IMAGE DENOISING OPTIMIZING OBJECT CURVATURE

(75) Inventors: Noha Youssry El-Zehiry, Plainsboro, NJ (US); Leo Grady, Millbrae, CA (US)

(73) Assignee: Siemens Aktiengesellschaft, Munich (DE)

(*) Notice: Subject to any disclaimer, the term of this patent is extended or adjusted under 35 U.S.C. 154(b) by 734 days.

(21) Appl. No.: 13/182,820

(22) Filed: Jul. 14, 2011

(65) Prior Publication Data

US 2012/0057765 A1 Mar. 8, 2012

Related U.S. Application Data

(60) Provisional application No. 61/380,497, filed on Sep. 7, 2010.

(51) Int. Cl.
*G06K 9/00* (2006.01)
*G06T 5/00* (2006.01)

(52) U.S. Cl.
CPC ................................ *G06T 5/002* (2013.01)

USPC ......................................................... 382/254

(58) Field of Classification Search
USPC ......................................................... 382/254
See application file for complete search history.

(56) References Cited

U.S. PATENT DOCUMENTS

2007/0014473 A1* 1/2007 Slabaugh et al. ............. 382/173
2013/0181711 A1* 7/2013 Chaari et al. ................. 324/309

* cited by examiner

*Primary Examiner* — Wesley Tucker

(57) ABSTRACT

A method for removing noise from an image includes receiving image data including a plurality of pixels. A graph including a plurality of nodes and a plurality of edges interconnecting the nodes is formulated. Each pixel of the image data is represented as a node of the graph and each edge of the graph is assigned a weight based on a penalty function applied to the nodes connected by the edge where the penalty function is less when a value of a given pixel of the plurality of pixels is between or equal to the values of two neighboring pixels than when the value of the given pixel is either greater than or less than the values of both of the two neighboring pixels. A total penalty of the graph is minimized. A denoised image is provided based on the total penalty-minimized graph.

15 Claims, 3 Drawing Sheets

SYSTEM AND METHOD FOR IMAGE DENOISING OPTIMIZING OBJECT CURVATURE

CROSS-REFERENCE TO RELATED APPLICATION

The present application is based on provisional application Ser. No. 61/380,497, filed Sep. 7, 2010, the entire content of which are herein incorporated by reference.

BACKGROUND OF THE INVENTION

1. Technical Field

The present disclosure relates to image denoising and, more specifically, to a system and method for image denoising optimizing object curvature.

2. Discussion of Related Art

Noise reduction, or denoising, is the process of removing noise from a signal such as a digital image signal. Noise may be introduced into an image signal both at the time of acquisition, for example, due to the limitations of the image-acquiring device, or at any point thereafter. It is often desirable to remove noise from an image. For example, in the case of medical images, such as computed tomography (CT) images and magnetic resonance imaging (MRI), noise may interfere with the diagnostic value of the medical image. While denoising may increase the diagnostic value of medical images, it is also possible that suboptimal denoising techniques may inadvertently remove actual image features and reduce the diagnostic value of medical images to some degree.

Image denoising also has uses beyond processing of medical images. For example, photographic images may also be susceptible to noise and denoising may be used to enhance these images as well.

Accordingly, image denoising and/or filtering may be a preliminary step in many image processing schemes. Image denoising may be used to remove artifacts associated with image acquisition and other imaging problems.

One simple approach to denoising is to replace the color of a pixel with an average of nearby pixel colors. Such an approach may be particularly effective where there is some reason for neighboring pixels to share color values. However, such an approach may also create a blurring effect at points of the image where intensity change is abrupt. This phenomena may be particularly apparent for images including geometric patterns.

Non-local means denoising is another approach to image denoising in which rather than assuming that pixels share commonality with adjacent pixels, the image is instead searched for other areas that are similar in appearance to the area currently being denoised. Then, the pixel value for the pixel being denoised is replaced with an average pixel value for the most similar areas.

Many existing approaches to image denoising seek to minimize an energy function that generally combines a prior data fidelity term with a regularization term encoding a model of image structure. For example, total variation (TV) has been commonly used as an energy function that may be minimized in performing image denoising. Such approaches may be referred to herein as TV denoising.

SUMMARY

A method for removing noise from an image includes receiving image data including a plurality of pixels. A graph including a plurality of nodes and a plurality of edges interconnecting the nodes is formulated. Each pixel of the image data is represented as a node of the graph and each edge of the graph is assigned a weight based on a penalty function applied to the nodes connected by the edge. A total penalty of the graph is minimized. A denoised image is provided based on the total penalty-minimized graph. The penalty function is less when a value of a given pixel of the plurality of pixels is between or equal to the values of two neighboring pixels than when the value of the given pixel is either greater than or less than the values of both of the two neighboring pixels.

The denoised image may be provided based on the total penalty-minimized graph by using each node of the total penalty-minimized graph as a pixel of the denoised image. The penalty function may be determined for a set of three neighboring nodes j, i, and k, and the determined penalty function may be used as a weight for an edge connecting node j with node i and as a weight for an edge connecting node i with node k. The penalty function may be zero when the value of pixel i is less than or equal to the value of pixel j and the value of pixel i is greater than or equal to the value of pixel k; or the value of pixel i is greater than or equal to the value of pixel j and the value of pixel i is less than or equal to the value of pixel k. The penalty function may be greater than zero and the penalty function may increase as the value of pixel i increases when the value of pixel i is greater than both the value of pixel j and the value of pixel k. The penalty function may increase as the value of pixel i decreases when the value of pixel i is less than both the value of pixel j and the value of pixel k.

The penalty function may be defined as a quantification of curvature between neighboring pixels. The penalty function for a neighborhood of three neighboring nodes j, i, and k, may be defined as:

$$w_{ij}|x_i - x_j| + w_{ik}|x_i - x_k| - w_{jk}|x_j - x_k|$$

where $w_{ij}$ is a curvature weight for nodes i and j, $w_{ik}$ is a curvature weight for nodes i and k, $w_{jk}$ is a curvature weight for nodes j and k, $x_i$ is the value of node i, $x_j$ is the value of node j, and $x_k$ is the value of node k. The curvature weight may be defined as:

$$\min\{l_{eij}, l_{eik}\} \left( \frac{\alpha}{\min\{l_{eij}, l_{eik}\}} \right)^2$$

where $l_{eij}$ and $l_{eik}$ are the weights of the edges $e_{ij}$ and $e_{ik}$, respectively, the edge weights are calculated according to the penalty function, and $\alpha$ is the angle between the two edges in radians.

The received image data may include medical image data in two or three dimensions. The received image data may be a magnetic resonance image. The received image data may be a computed tomography image.

A method for removing noise from an image includes receiving image data including a plurality of pixels. A plurality of neighborhoods of three neighboring pixels of the received image data is identified. An intensity value of a center pixel of a neighborhood of three neighboring pixels is reduced if and only if the value of the center pixel is greater than the values of both of the other pixels of the neighborhood of three neighboring pixels. The intensity value of the center pixel of the neighborhood of three neighboring pixels is increased if and only if the value of the center pixel is less than the values of both of the other pixels of the neighborhood of three neighboring pixels. The intensity value of the center pixel of the neighborhood of three neighboring pixels is neither reduced nor increased when the value of the center pixel is between the values of the other pixels of the neighborhood of three neighboring pixels or the value of the center pixel of the neighborhood of three neighboring pixels is equal to the values of one or both of the other pixels of the neighborhood of three neighboring pixels.

The steps of increasing and reducing may be performed iteratively until the received image data has been sufficiently removed of noise. The received image data may include medical image data in two or three dimensions. The received image data may be a magnetic resonance image. The received image data may be a computed tomography image.

A computer system includes a processor and a non-transitory, tangible, program storage medium, readable by the computer system, embodying a program of instructions executable by the processor to perform method steps for removing noise from an image. The method includes receiving image including a plurality of pixels. A penalty is determined for each neighborhood of three neighboring pixel within the received image, the neighborhood including a middle pixel and two neighboring pixels, the penalty being zero when a value of the middle pixel is between or equal to the values of the neighboring pixels and the penalty being greater than zero when the value of the middle pixel is not between or equal to the values of the neighboring pixels. The determined penalty is minimized over the entire received image. A denoised image is provided based on the penalty-minimized image.

The received image may include a two or three-dimensional medical image. Minimizing the determined penalty over the entire received image may include iteratively adjusting pixel values of the received image and determining the penalty for each neighborhood of three neighboring pixel within the denoised image. The received image may include a magnetic resonance image or a computed tomography image.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

Figure 1:
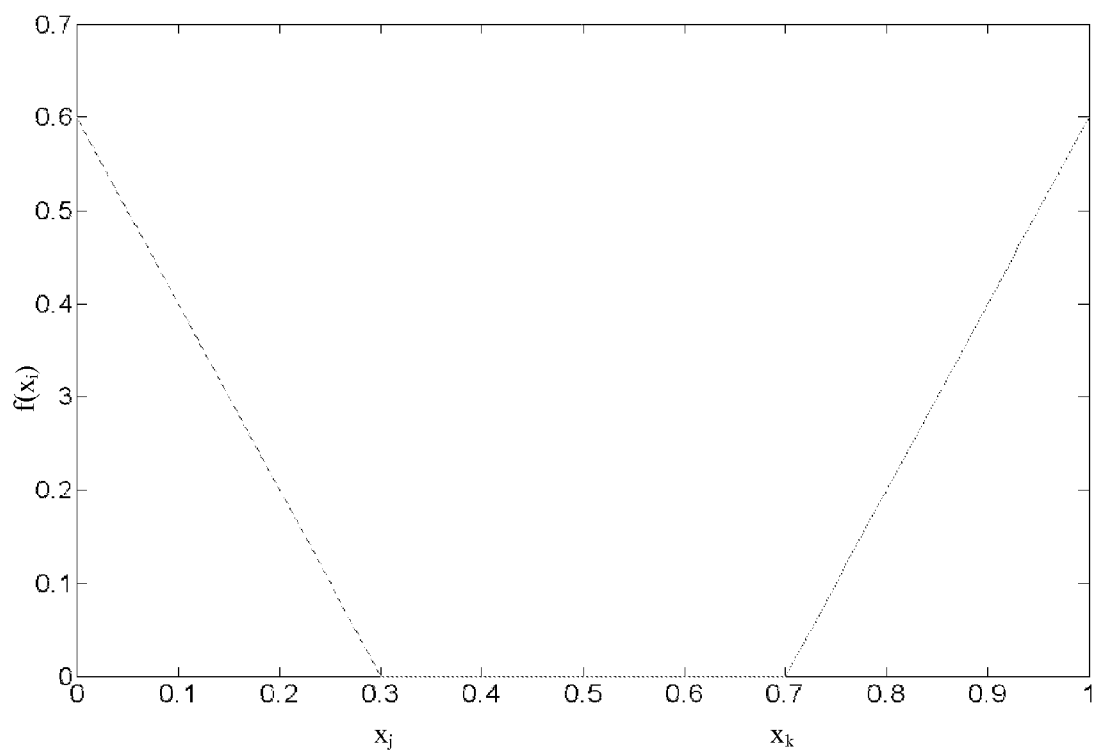
FIG. 1 is a chart illustrating a penalty function for a given pixel $f(x_i)$ based on a relationship between its value and the value of its neighbors $x_j$ and $x_k$ according to exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention may provide systems and methods for image denoising in which object curvature is optimized. These approaches involve curvature regularization, where the image is optimized for low curvature and smooth lines. In this way, abrasive edges and jagged lines may be filtered to appear more straight thereby denoising an image while maintaining image sharpness.

As described above, in conventional noise reduction techniques, a pixel value may be assigned an average value of its neighbors. In more sophisticated approaches such as the TV approach, rather than simply reassigning pixel values as an average value of neighbors, an energy function is created in which a difference between a pixel and its neighbors is characterized. The greater the difference is the greater the energy function will be. Then, by minimizing the energy function of the image, the difference between neighboring pixels is reduced and the image denoised. The energy function may also be regarded as a penalty and minimizing the energy function may be thought of as reducing the penalty associated with undesirable image characteristics. However, the TV approach to denoising may also lead to blurring of lines and other areas of sharp contrast.

Exemplary embodiments of the present intention seek to provide approaches to denoising in which sharpness of areas of high contrast is preserved. This may be accomplished, for example, by modifying the energy function that is minimized. In this way, exemplary embodiments of the present invention provide a new way for calculating penalty so that when minimized, the image is denoised while remaining sharp.

According to one such technique, the penalty function may be formulated such that penalty is lesser when a value of a pixel is between the values of two neighboring pixels and the penalty is greater when the value of the pixel is not between the values of two of its neighbors. For example, a low-value pixel that is situated between two high-value pixels would produce a greater penalty than a medium-value pixel that is situated between a low-value pixel on one side and a high-value pixel on another side. Additionally, a high-value pixel that is situated between a high-value pixel on one side and a low-value pixel on another side would also produce a lesser penalty and accordingly, a line of high contrast would not be blurred because such an interface would present itself as a pixel that has a value between a value of a first neighbor and a value of a second neighbor.

Exemplary embodiments of the present invention may perform optimization based on a graph representation of the image in which each pixel of the image appears as a vertex or node of the graph and the edge weight between vertices is defined to reflect the energy terms. Thus, formulating the image as a graph involves calculating edge weights according to an approach for calculating energy/penalty function and then minimizing the total energy/penalty of the entire graph. In describing this process, particular attention will be paid to the manner in which the energy/penalty is calculated so as to provide the characteristics described above in which a reduced penalty is attributed to a pixel with a value that is between the values of its adjacent pixels.

As the formulation and the optimization may be performed on a graph, the following graph terminology may be used herein. The graph $\mathcal{G}=\{V,E\}$ consists of a set of vertices $v \in V$ and a set of edges $e \in E \subseteq V \times V$. An edge incident to vertices $v_i$ and $v_j$, may be denoted $e_{ij}$. A weighted graph is a graph in which every edge $e_{ij}$ is assigned a weight $w_{ij}$. As described above, the edge weights may reflect energy terms. Here, each pixel $i=(x,y)$ may be associated with a continuous variable $x_i$ that may represent the denoised intensity value of pixel i. Each variable $x_i$ may have a corresponding vertex $v_i$ in the graph $\mathcal{G}$. The graph in which each node corresponds to a pixel in the image of interest may be known as the primal graph.

Exemplary embodiments of the present invention may define a penalty for pairs of edges on the primal graph. For every pair of incident edges, $e_{ij}$ and $e_{ik}$ (where the pixel i neighbors pixel j on one side and pixel k on the other side), in an N-connected graph, the boundary of minimum curvature may be found by minimizing the energy function:

$$E(x_i,x_j,x_k)=w_{ij}|x_i-x_j|+w_{ik}|x_i-x_k|-w_{jk}|x_j-x_k| \quad (1)$$

where $$w_{ij} = w_{ik} = w_{jk} = \frac{w_{ijk}}{2}$$

and $w_{ijk}$ is the curvature weight, w, expressed as:

$$w = \min\{l_{eij}, l_{eik}\}\left(\frac{\alpha}{\min\{l_{eij}, l_{eik}\}}\right)^2 \quad (2)$$

where $l_{eij}$ and $l_{eik}$ are the lengths of the edges $e_{ij}$ and $e_{ik}$, respectively, and $\alpha$ is the angle between them in radians. This angle $\alpha$ may be, for example, $\pi/4$ although other values may be used as well. The curvature regularization may then be used either in conjunction with a data smoothness term, weighted by the input image, or both. For weighted curvature, for example, the weight of the clique of three neighboring pixels jik may be defined as:

$$w_{ijk}=we^{(-\beta(f_i-f_j)^2)}e^{(-\beta(f_i-f_k)^2)} \quad (3)$$

where $\beta$ is a free parameter, $f_i$, $f_j$, and $f_k$ are the image intensity pixels i, j, and k, respectively. The free parameter $\beta$ may be set as, for example, 100, although other values may be used. It should be noted that even though the curvature clique may penalize the cut of the edge pair $e_{ij}$ and $e_{ik}$, the decomposition in equation (1) may effectively add an edge $e_{jk}$ having negative weight. This new set of effective edges which have nonzero weights may be denoted herein E* and it should further be noted that $E \subseteq E^*$. The variable x may be used as a binary indicator that indicates to which class a particular pixel belongs. However, exemplary embodiments of the present invention, for example, as described in detail below, may provide the formulation of curvature regularization in the context of image filtering by relaxing the indicator variable x to a continuous variable that may represent the filtered image.

As described above, exemplary embodiments of the present invention provide approaches for defining the energy function and/or penalty function associated with the edge pairs such that when the total energy/penalty of the graph is minimized, a denoised image may be constructed therefrom. The energy formulations discussed herein are defined in terms of a two-dimensional image however; exemplary embodiments of the present invention are not limited thereto and may be applied to three-dimensional images by straightforward extension of the concepts described herein.

Denoising may be described in terms of recovering an original image x from a noisy image $f$, wherein:

$$f_i=x_i+n_i \quad (4)$$

where $f$ represents the observed image at the pixel/node i, $x_i$ represents the true image without noise at the pixel/node i and $n_i$ represents the noise contribution at the given pixel/node.

The image value at each pixel/node $x_i$ may either be a binary value or may represent an intensity value of any desired depth. Accordingly, for an adjacent pair of edges (e.g. a clique of three neighboring pixels/nodes), a pixel $x_i$ is not penalized (e.g. may have a low energy) if $f_j \leq f_i \leq f_k$. Here pixel i represents the middle pixel and thus there is no penalty where the value of a noisy image pixel is between or equal to the values of its left and right (or top and bottom) neighbor. Otherwise, the penalty may be based on the intensity change.

FIG. 1 is a chart illustrating a penalty function for a given pixel $f(x_i)$ based on a relationship between its value and the value of its neighbors $x_j$ and $x_k$. As can be seen by this figure, a penalty of zero is provided when the value of the middle pixel xi is between or equal to the values of the flanking neighbors and a penalty increases as the value of the middle pixel is increasingly beyond the values of the flanking neighbors.

As discussed above, the value of each image pixel $x_i$ may either be binary or a continuous value. When the value is relaxed to be continuous, the energy function, an example of which is depicted in FIG. 1, may become convex and may be efficiently optimized using, for example, descent methods. Formally, given an initial value for $x=f$, the denoised image may be obtained iteratively as $x=\text{argmin } E(x)$ where the denoised energy $E(x)$ is expresses as follows:

$$E(x)=\lambda E_{data}+E_{regularization}=\lambda\|x-f\|_2^2+1^T G|Ax| \quad (5)$$

with gradient:

$$\frac{\partial E}{\partial x} = 2\lambda\|x-f\| + A^T G \text{ sgn}(Ax) \quad (6)$$

where A is the edge node incidence matrix of the graph $\mathcal{G}$ (with the effective edge set E*) representing the image $f$. Here, the edge node incidence matrix A may be defined as:

$$A(e_{i,j}, v_k) = \begin{cases} +1 & \text{if } i = k \\ -1 & \text{if } j = k \\ 0 & \text{otherwise} \end{cases} \quad (7)$$

Here G is the constitutive matrix, which may be a diagonal matrix with the square weight of each edge along the diagonal and $\lambda$ is a tuning parameter that determines the strength of the regularization with respect to the data term. The term $\lambda$ may be set as, for example, 20, although other values may be used.

The following iterative updates may be used to perform gradient descent on the observed noisy image $f$ according the energy E:

$$x^{k+1} = x^k - \Delta t \frac{\partial E}{\partial x} \quad (8)$$

where $\Delta t$ is the time step for the update. The time step $\Delta t$ may be, for example, 0.001, although other values may be used. Accordingly, exemplary embodiments of the present invention may utilize equations (5), (6) and (8) to perform the image denoising with curvature regularization. Additionally, to reduce blocking artifacts, a diffusion term may be added to get a modified energy E defined as:

$$E(x)=\lambda E_{data}+E_{regularization}+\mu E_{diffusion}=\lambda\|x-f\|_2^2+ \\ 1^T G|Ax|+\mu x^T Lx \quad (9)$$

with gradient:

$$\frac{\partial E}{\partial x} = 2\lambda \|x - f\| + A^T G \text{sgn}(Ax) + 2\mu L x \quad (10)$$

where L is the weighted Laplacian matrix for which the edge weights are defined as $w_{ij} = \exp(-\gamma(f_i - f_j)^2)$, and $\mu$ is a weighting coefficient that controls strength of the diffusion. The weighted coefficient $\mu$ may be set as, for example, 2, although other values may be used. Therefore, equation (10) may be used to perform the update in equation (8) and the weighted Laplacian matrix may be recalculated every n iterations, for example, n=10 and thus the Laplacian matrix may be recalculated every 10 iterations, although other values for n may be used.

Figure 2:
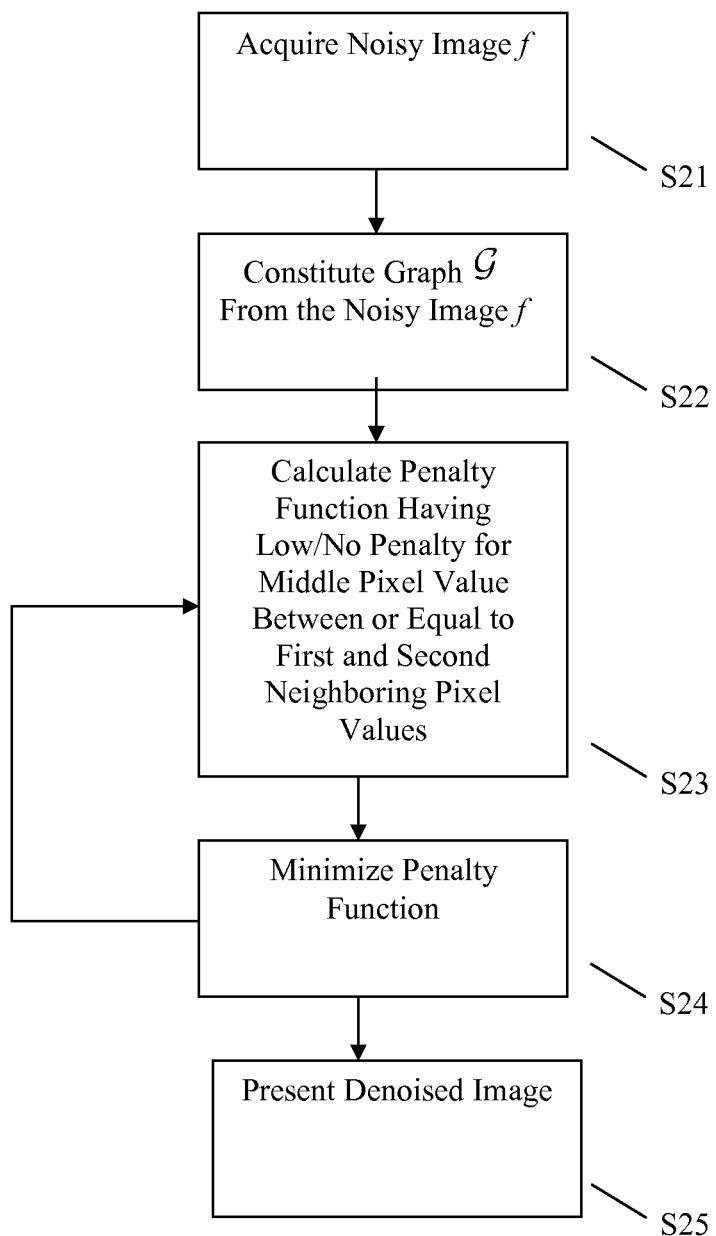
FIG. 2 is a flow chart illustrating an approach for performing image denoising according to an exemplary embodiment of the present invention.

FIG. 2 is a flow chart illustrating an approach for performing image denoising according to an exemplary embodiment of the present invention. First, a noisy image $f$ may be acquired (Step S21). The image $f$ may be two-dimensional or three-dimensional medical image data such as an MRI or a CT scan. The noise present in the image $f$ may be attributable to the image acquisition or any other source. The image $f$ may be acquired either directly from a scanning device or may be loaded from a storage device. A graph $\mathcal{G}$ may then be constructed from the acquired noisy image $f$ (Step S22). The graph $\mathcal{G}$ may be defined as $\mathcal{G} = \{V, E^*\}$ where V represents the set of vertices and $E^*$ represents the set of edges having non-zero weights. Each vertex $v_i$ may correspond to a pixel i in the image $f$. Each edge $e_{ij}$ may correspond to the edge connecting the pixel i with a first neighboring pixel j and each edge $e_{ik}$ may correspond to the edge connecting the pixel i with a second neighboring pixel k.

The edge weights may be calculated as a penalty in which the penalty is relatively small or zero where a value of a middle pixel is between or equal to each of the values of both neighboring pixels and the penalty is relatively large or non-zero where the value of the middle pixel is not between or equal to each of the values of both neighboring pixels (Step S23). Moreover, the penalty may be increasingly large as the value of the middle pixel is increasingly beyond the range between the two neighboring pixels. For example, the edge weight may be calculated in accordance with equation (3) above. It should be noted that the clique of three pixels may form a row or a column of the image and both the neighboring pixels j and k may be on opposite sides of the middle pixel i with respect to a common axis. Additionally, an edge node incidence matrix A may be calculated from the defined graph $\mathcal{G}$, for example, in accordance with equation (7) above, a constitutive matrix G may be calculated, for example, in accordance with the description above, and a weighted Laplacian matrix L may be calculated in accordance with the description above.

The set of edge weights may then be minimized to produce a denoised image (Step S24). Minimization of the edge weights may be performed iteratively, for example, the gradient of the energy/penalty function may be calculated using equation (10) and equation (8) with initial the conditions $x^0 = f$. Iteration may be performed by recalculating the weighted Laplacian matrix L if k mod n=0 until $\|x_k - x_{k-1}\|_2^2 < \epsilon$. After the edge weights have been minimized, the denoised image may be displayed and or saved to a storage device (Step S25).

Figure 3:
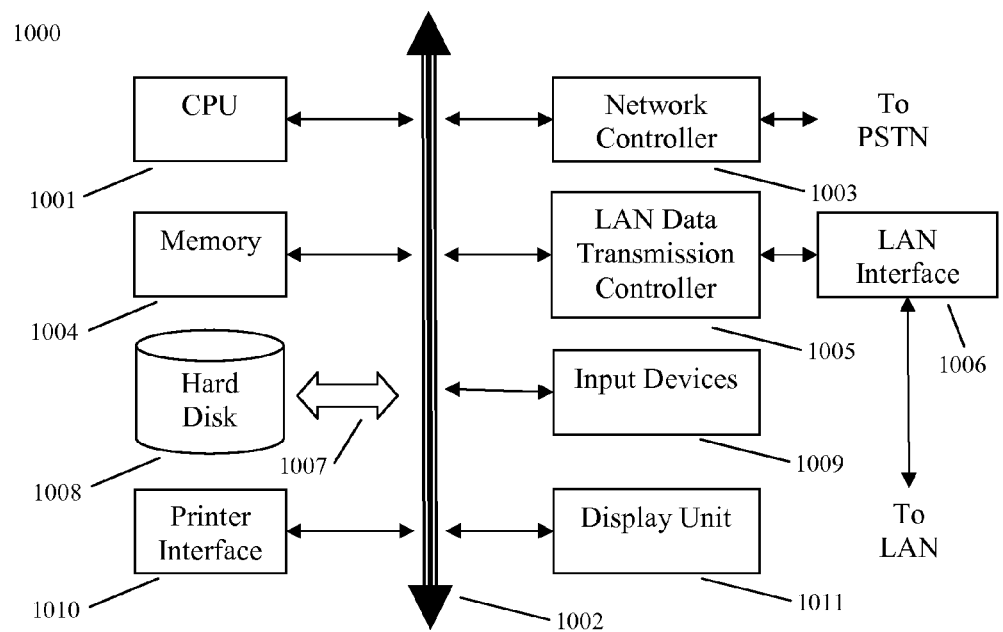
FIG. 3 shows an example of a computer system capable of implementing the method and apparatus according to embodiments of the present disclosure.

FIG. 3 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for removing noise from an image, comprising:
   receiving image data including a plurality of pixels;
   formulating a graph including a plurality of nodes and a plurality of edges interconnecting the nodes, wherein each pixel of the image data is represented as a node of the graph and each edge of the graph is assigned a weight based on a penalty function applied to the nodes connected by the edge;
   minimizing a total penalty of the graph; and
   providing a denoised image based on the total penalty-minimized graph,
   wherein the penalty function is less when a value of a given pixel of the plurality of pixels is between or equal to the values of two neighboring pixels than when the value of the given pixel is either greater than or less than the values of both of the two neighboring pixels.

2. The method of claim 1, wherein the denoised image is provided based on the total penalty-minimized graph by using each node of the total penalty-minimized graph as a pixel of the denoised image.

3. The method of claim 1, wherein the penalty function is determined for a set of three neighboring nodes j, i, and k, and
   the determined penalty function is used as a weight for an edge connecting node j with node i and as a weight for an edge connecting node i with node k.

4. The method of claim 3, wherein the penalty function is zero when:
   the value of pixel i is less than or equal to the value of pixel j and the value of pixel i is greater than or equal to the value of pixel k; or
   the value of pixel i is greater than or equal to the value of pixel j and the value of pixel i is less than or equal to the value of pixel k.

5. The method of claim 3, wherein the penalty function is greater than zero and:
   the penalty function increases as the value of pixel i increases when the value of pixel i is greater than both the value of pixel j and the value of pixel k; and
   the penalty function increases as the value of pixel i decreases when the value of pixel i is less than both the value of pixel j and the value of pixel k.

6. The method of claim 1, wherein the penalty function is defined as a quantification of curvature between neighboring pixels.

7. The method of claim 1, wherein the penalty function for a neighborhood of three neighboring nodes j, i, and k, is defined as:

$$w_{ij}|x_i-x_j|+w_{ik}|x_i-x_k|-w_{jk}|x_j-x_k|$$

wherein $w_{ij}$ is a curvature weight for nodes i and j, $w_{ik}$ is a curvature weight for nodes i and k, $w_{jk}$ is a curvature weight for nodes j and k, $x_i$ is the value of node i, $x_j$ is the value of node j, and $x_k$ is the value of node k.

8. The method of claim 7, wherein the curvature weight is defined as:

$$\min\{l_{eij}, l_{eik}\}\left(\frac{\alpha}{\min\{l_{eij}, l_{eik}\}}\right)^2$$

wherein $l_{eij}$ and $l_{eik}$ are the weights of the edges $e_{ij}$ and $e_{ik}$, respectively, the edge weights are calculated according to the penalty function, and $\alpha$ is the angle between the two edges in radians.

9. The method of claim 1, wherein the received image data comprises medical image data in two or three dimensions.

10. The method of claim 1, wherein the received image data is a magnetic resonance image.

11. The method of claim 1, wherein the received image data is a computed tomography image.

12. A computer system comprising:
a processor; and
a non-transitory, tangible, program storage medium, readable by the computer system, embodying a program of instructions executable by the processor to perform method steps for removing noise from an image, the method comprising:
receiving image including a plurality of pixels;
determining a penalty for each neighborhood of three neighboring pixel within the received image, the neighborhood including a middle pixel and two neighboring pixels, the penalty being zero when a value of the middle pixel is between or equal to the values of the neighboring pixels and the penalty being greater than zero when the value of the middle pixel is not between or equal to the values of the neighboring pixels;
minimizing the determined penalty over the entire received image; and
providing a denoised image based on the penalty-minimized image.

13. The computer system of claim 12, wherein the received image comprises a two or three-dimensional medical image.

14. The computer system of claim 12, wherein minimizing the determined penalty over the entire received image comprises iteratively adjusting pixel values of the received image and determining the penalty for each neighborhood of three neighboring pixel within the denoised image.

15. The computer system of claim 12, wherein the received image comprises a magnetic resonance image or a computed tomography image.

* * * * *